United States Patent
Shetty et al.

(10) Patent No.: US 10,791,024 B1
(45) Date of Patent: Sep. 29, 2020

(54) ADAPTIVE NETWORK INTERFACE CONFIGURATION

(71) Applicant: Dell Products, L.P., Round Rock, TX (US)

(72) Inventors: Sudhir Vittal Shetty, Cedar Park, TX (US); Pushkala Iyer, Round Rock, TX (US); Reginald H. Stumpe, Jr., Round Rock, TX (US); Rakesh Kumar Ayolasomyajula, Georgetown, TX (US); David Matthew Sisson, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 7 days.

(21) Appl. No.: 16/352,288

(22) Filed: Mar. 13, 2019

(51) Int. Cl.
| | |
|---|---|
| H04L 12/24 | (2006.01) |
| H04L 29/06 | (2006.01) |
| G06F 9/455 | (2018.01) |
| G06F 3/06 | (2006.01) |
| G06F 15/173 | (2006.01) |

(52) U.S. Cl.
CPC .......... *H04L 41/0813* (2013.01); *H04L 41/12* (2013.01); *G06F 3/065* (2013.01); *G06F 9/455* (2013.01); *G06F 15/173* (2013.01); *H04L 67/38* (2013.01)

(58) Field of Classification Search
CPC ..... H04L 41/0813; H04L 41/12; H04L 67/38; G06F 3/065; G06F 9/455; G06F 15/173
See application file for complete search history.

(56) References Cited

U.S. PATENT DOCUMENTS

| | | | | |
|---|---|---|---|---|
| 8,813,209 | B2 * | 8/2014 | Bhattacharya | ...... H04L 63/0263 726/11 |
| 9,195,483 | B2 * | 11/2015 | Devarapalli | ............ G06F 9/455 |
| 9,218,303 | B2 * | 12/2015 | Chandrasekhar | ... H04L 12/4625 |
| 9,471,234 | B2 * | 10/2016 | Devarappalli | .......... G06F 9/455 |
| 10,348,685 | B2 * | 7/2019 | Chalvadi | ............... H04L 45/745 |
| 10,419,393 | B2 * | 9/2019 | Branch | .................... H04L 41/12 |
| 10,498,645 | B2 * | 12/2019 | Chandrasekhar | ..... H04L 41/145 |
| 2019/0068456 | A1 * | 2/2019 | Lotfi | .................... G06F 11/3006 |
| 2019/0097894 | A1 * | 3/2019 | Lotfi | ..................... H04L 41/145 |

\* cited by examiner

*Primary Examiner* — Brian T O Connor
(74) *Attorney, Agent, or Firm* — Fogarty LLP

(57) ABSTRACT

Within a data center, network interfaces may vary greatly. Network controllers from various manufacturers may support different capabilities and may be implemented as different types of hardware devices. Embodiments provide techniques for adaptive configuration of a network interface that is migrated from a source IHS to a target IHS. A network migration tool evaluates discrepancies between the source network interface configuration and the target network interface configuration. Based on the identified discrepancies, the network migration tool determines whether the target network interface may be adapted to be compatible, or at least not incompatible, with the source network interface. Multiple IHSs may be evaluated as potential targets for migration to identify a target IHS that utilizes a target network interface that most closely aligns with the configuration of the source network interface, where this alignment includes adaptive modifications of the target network interface.

20 Claims, 4 Drawing Sheets

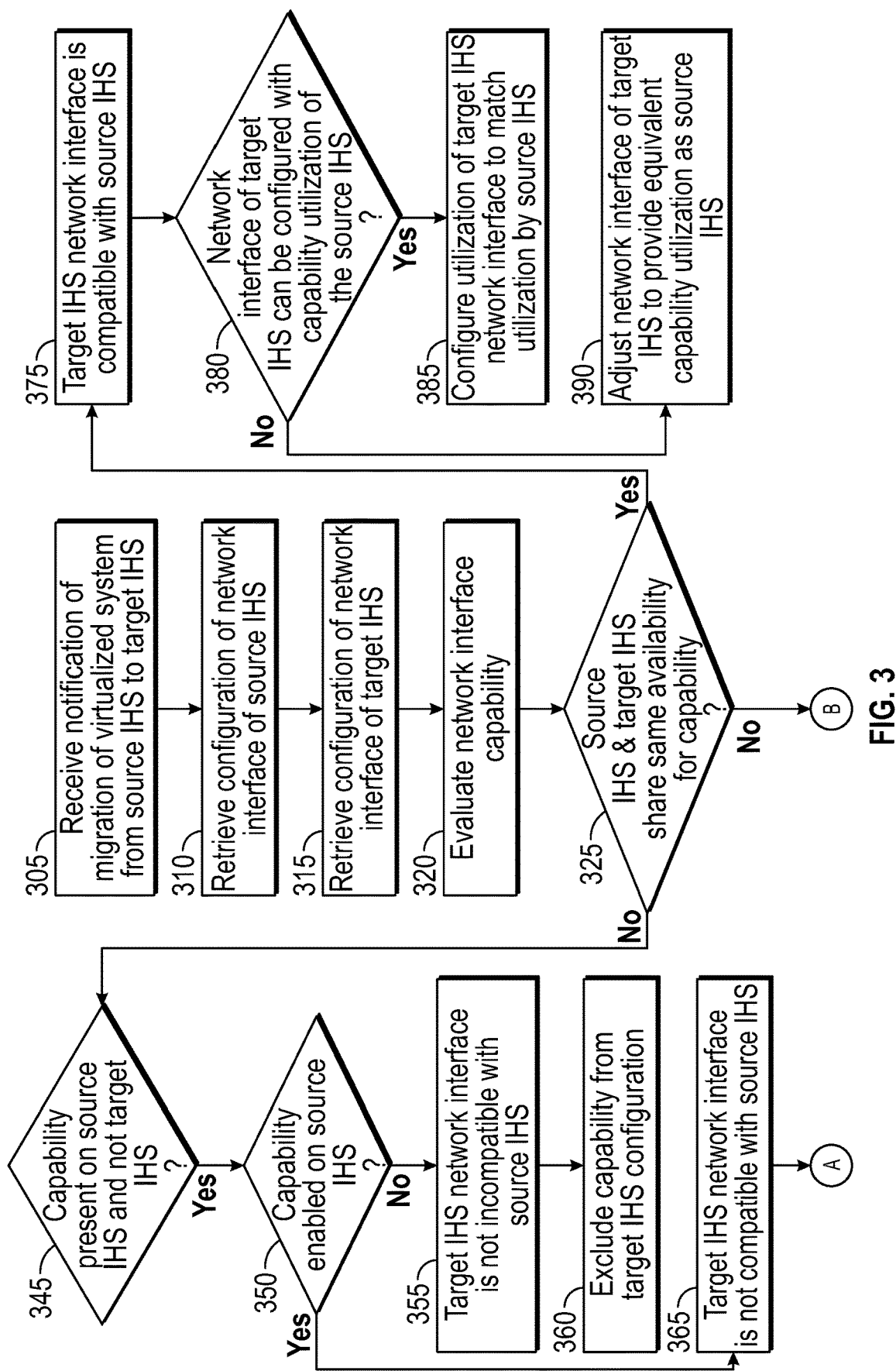

ADAPTIVE NETWORK INTERFACE CONFIGURATION

FIELD

This disclosure relates generally to Information Handling Systems (IHSs), and more specifically, to configuration of network interfaces used by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise servers that may be stacked within racks. A data center may include large numbers of such racks that may be organized in rows. In such environments, IHSs may be moved to different racks within the data center as IHSs are repurposed, or in support repairs and upgrades. Each of the IHSs within a data center may support multiple virtualized systems, such as virtual machines, hypervisors and/or containers, that allow an IHS to simultaneously run multiple operating systems or other execution environments. Similar to the physical IHSs, virtual systems may be migrated within a data center from one IHS to another. When virtual systems are being migrated from a source IHS to a target IHS, hardware abstractions allow the virtual systems to be moved without having to account for some of the different hardware that may be utilized by the source IHS and the target IHS. However, certain aspects of the underlying hardware, such as network controller configurations, may not be abstracted in this manner.

SUMMARY

In various embodiments, a method is provided for migration of a network interface from a source IHS to a corresponding network interface of a target IHS. The method includes: identifying a first capability of the source network interface that is not available in the target network interface; if the first capability is utilized in the source network interface, signaling incompatibility of the target network interface for the migration; identifying a second capability of the target network interface that is not available in the source network interface; removing the second capability from the target network interface; identifying a third capability that is available in the source network interface and the target network interface; and configuring a utilization of the third capability in the target network interface to be compatible with a utilization of the third capability in source network interface.

In additional method embodiments, the utilization of the third capability comprises one of: enabling the third capability and disabling the third capability. In additional method embodiments, the utilization of the third capability further comprises configuring a plurality of network port partitions of the target network interface identical to a plurality of network port partitions of the source network interface. In additional method embodiments, the identical configuration of network partitions maintains a primary partition and a plurality of non-primary partitions of the source network interface in the configuration of the target network interface. In additional method embodiments, the configuration of the utilization of the third capability further comprises configuring a plurality of network port partitions of the target network interface in a compatible configuration with a plurality of network port partitions of the source network interface. In additional method embodiments, the target IHS is selected for the migration based on a correspondence between an installed location of a target network device configured by the target network interface and an installed location of a source network device configured by the source network interface. In additional method embodiments, the target IHS is selected for the migration based on a correspondence between a provider of a target network device configured by the target network interface and a provider of a source network device configured by the source network interface. In additional embodiments, the method further includes removing the first capability from the target network interface, if the first capability is not utilized in the source network interface.

In various additional embodiments, a system is provided for migration of a network interface from a source IHS to a corresponding network interface of a target IHS of a plurality of managed IHSs. The system includes the plurality of Information Handling Systems (IHSs) comprising a source IHS and a target IHS. The system also includes a network migration tool operable to migrate a network interface from the source IHS to a corresponding network interface of the target IHS, wherein the network migration tool is configured to: identify a first capability of the source network interface that is not available in the target network interface; if the first capability is utilized in the source network interface, signal incompatibility of the target network interface for the migration; identify a second capability of the target network interface that is not available in the source network interface; remove the second capability from the target network interface; identify a third capability that is available in the source network interface and the target network interface; and configure a utilization of the third capability in the target network interface to be compatible with a utilization of the third capability in source network interface.

In additional system embodiments, the utilization of the third capability comprises one of: enabling the third capability and disabling the third capability. In additional system embodiments, the utilization of the third capability further comprises configuring a plurality of network port partitions of the target network interface identical to a plurality of network port partitions of the source network interface. In additional system embodiments, the identical configuration of network partitions maintains a primary partition and a plurality of non-primary partitions of the source network interface in the configuration of the target network interface. In additional system embodiments, the configuration of the utilization of the third capability further comprises configuring a plurality of network port partitions of the target network interface in a compatible configuration with a plurality of network port partitions of the source network interface. In additional system embodiments, the target IHS is selected for the migration from the plurality of IHSs by the network migration tool based on a correspondence between an installed location of a target network device configured by the target network interface and an installed location of a source network device configured by the source network interface. In additional system embodiments, the target IHS is selected for the migration from the plurality of IHSs by the network migration tool based on a correspondence between a provider of a target network device configured by the target network interface and a provider of a source network device configured by the source network interface. In additional system embodiments, the network migration tool is further configured to determine a compatibility of the first capability, if the first capability is not utilized in the source network interface.

In additional embodiments, a target IHS configured for migration of a network interface from a source IHS to a corresponding network interface of the target IHS. The target IHS includes a network device configured by the target network interface, wherein the target network interface is determined as incompatible if a first capability of the source network interface is not available in the target network interface and the first capability is utilized in the source network interface. The target IHS further includes a remote access controller operable to configure the target network interface, wherein the remote access controller is configured to: remove a second capability from the target network interface, wherein the second capability is not available in the source network interface; and configure a utilization of the third capability of the target network interface to be compatible with a utilization of the third capability in source network interface.

In additional target IHS embodiments, the utilization of the third capability comprises one of: enabling the third capability and disabling the third capability. In additional target IHS embodiments, the utilization of the third capability further comprises configuring a plurality of network port partitions of the target network interface identical to a plurality of network port partitions of the source network interface. In additional target IHS embodiments, the identical configuration of network partitions maintains a primary partition and a plurality of non-primary partitions of the source network interface in the configuration of the target network interface.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
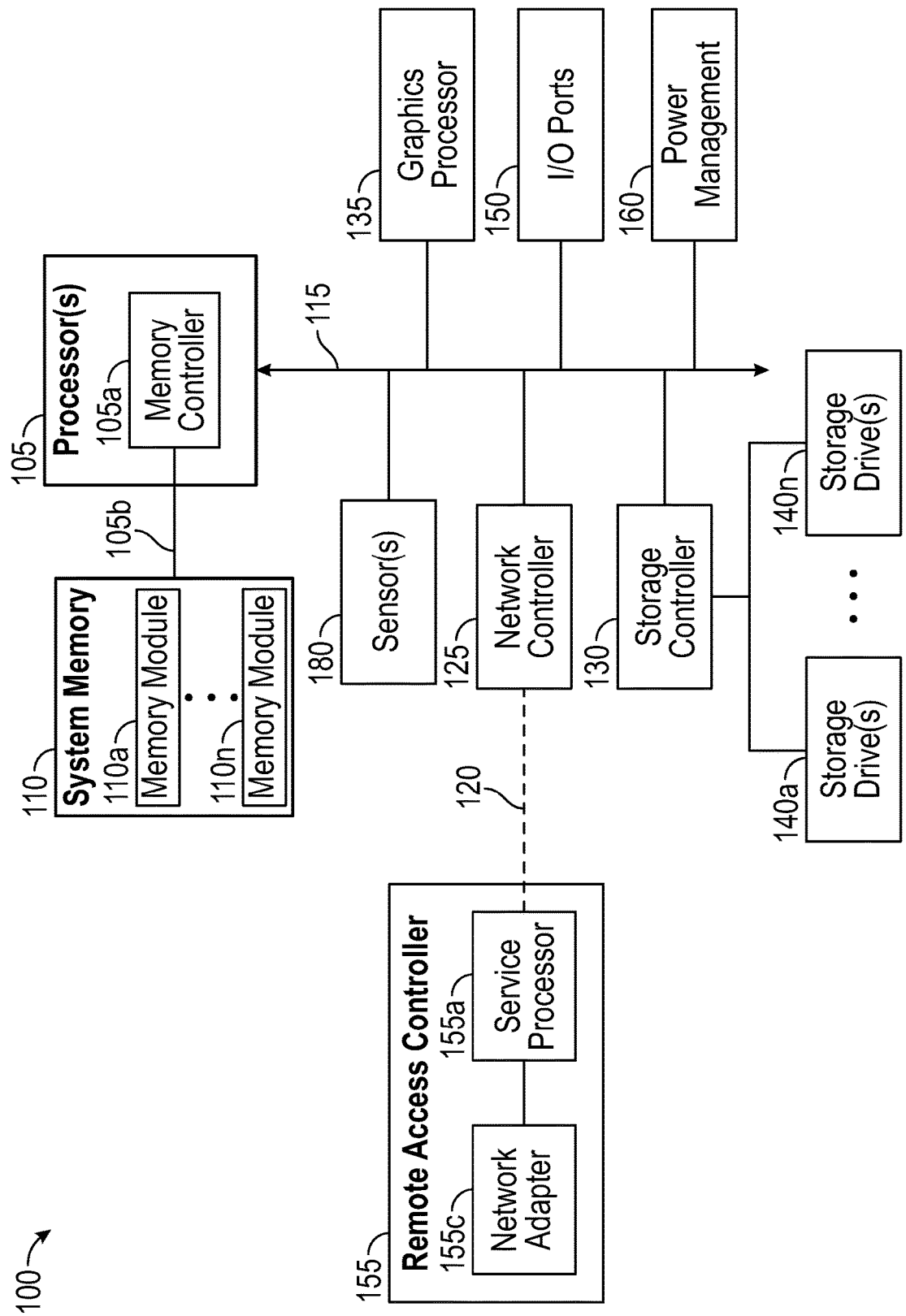
FIG. 1 is a block diagram depicting certain components of an IHS configured according to various embodiments for adaptive migration of the network interface of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of an enterprise computing device, other embodiments may be utilized.

As described, virtualized systems may be migrated within a data center from a source IHS to a target IHS. The migration of virtualized systems is aided by the use of hardware abstractions in which hardware resources are managed as logical, rather than physical, resources. When migrating a virtualized system from a source IHS to a target IHS, adapting the virtualized system to certain hardware resources of a target IHS may only require copying the logical configuration used on the source IHS to the target IHS. However, this technique may not be suitable for migrating the configuration of a network controller configuration from a source IHS to a target IHS.

Even within a single data center, network interface configurations may vary greatly between IHSs. Many different types of network controllers may be used within a data center. For instance, within a single data center, network controllers may be implemented as different types of expansion cards, as controllers implemented as systems-on-chips and as embedded microcontrollers. These different types of network controllers may be provided by various manufacturers and resellers and may include different capabilities. Due to such differences, migrating the configuration of a network controller from a source IHS to a target IHS commonly fails to properly configure the network controller of the target IHS for use by the virtual system being migrated to the target IHS. Accordingly, embodiments provide techniques for adaptive configuration of a network interface when migrating a virtualized system from a source IHS to a target IHS.

FIG. 1 is a block diagram illustrating certain components of an IHS 100 configured according to certain embodiments for use in implementing systems and methods described herein, in particular for adaptive migration of the network interface of the IHS 100. In certain data center embodiments, a rack-mounted chassis may include one or more bays that each receive an individual sled (that may be additionally or alternatively referred to as a tray, blade, and/or node), such as a compute sled, that provide processing resources and storage sleds that provide storage resources. In certain embodiments IHS 100 may be a compute sled installed within rack-mounted chassis housed within a data center. In such embodiments, IHS 100 may utilize certain shared power, network and cooling resources provided by the chassis and/or rack. Although the embodiment of FIG. 1 describes an IHS in the form of a compute sled or other computing component that may be deployed within a bay of a rack-mounted chassis, other embodiments may be implemented using other types of IHSs.

In certain embodiments, the IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

As illustrated, processor(s) 105 includes an integrated memory controller 105a that may be implemented directly within the circuitry of the processor 105, or the memory controller 105a may be a separate integrated circuit that is located on the same die as the processor 105. The memory controller 105a may be configured to manage the transfer of data to and from the system memory 110 of the IHS 100 via a high-speed memory interface 105b. The system memory 110 may be coupled to processor(s) 105 via a memory bus 105b that provides the processor(s) 105 with high-speed memory used in the execution of computer program instructions by the processor(s) 105. Accordingly, system memory 110 may include memory components, such as such as static RAM (SRAM), dynamic RAM (DRAM), NAND Flash memory, suitable for supporting high-speed memory operations by the processor(s) 105.

In certain embodiments, the system memory 110 may be comprised of multiple removable memory modules. The system memory 110 of the illustrated embodiment includes removable memory modules 110a-n. Each of the removable memory modules 110a-n may correspond to a printed circuit board memory socket that receives a removable memory module 110a-n, such as a DIMM (Dual In-line Memory Module), that can be coupled to the socket and then decoupled from the socket as needed, such as to upgrade memory capabilities or to replace faulty components. Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize a chipset that may be implemented by integrated circuits that are connected to each processor 105. All or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways served by bus 115. In certain embodiments, bus 115 may include a PCIe (PCI Express) switch fabric that is accessed via a PCIe root complex. IHS 100 may also include one or more I/O ports 150, such as PCIe ports, that may be used to couple the IHS 100 directly to other IHSs, storage resources or other peripheral components.

Processor(s) 105 may also be coupled to a power management unit 160 that may interface with a power system of a chassis in which an IHS 100 may be installed as a compute sled. In certain embodiments, a graphics processor 135 may be comprised within one or more video or graphics cards, or an embedded controller, installed as components of the IHS 100. In certain embodiments, graphics processor 135 may be an integrated in the remote access controller 155 and may be utilized to support the display of diagnostic and administrative interfaces related to IHS 100, via display devices that are coupled, either directly or remotely, to remote access controller 155. In certain embodiments, the remote access controller 155 and/or the operating system of IHS 100 may utilize information collected by various sensors 180 located within the IHS. For instance, temperature data collected by sensors 180 may be utilized by the remote access controller 155 in support of closed-loop airflow cooling of the IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100 and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by a remote access controller 155.

In certain embodiments, remote access controller 155 may operate from a different power plane from the processors 105 and other components of IHS 100, thus allowing the remote access controller 155 to operate, and management tasks to proceed, while the processing cores of IHS 100 are powered off. As described, various functions provided by the BIOS, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

As illustrated, remote access controller 155 may include a service processor 155a, or specialized microcontroller, that operates management software that supports remote monitoring and administration of IHS 100. Remote access controller 155 may be installed on the motherboard of IHS 100 or may be coupled to IHS 100 via an expansion slot provided by the motherboard. In support of remote monitoring functions, network adapter 125c may support connections with remote access controller 155 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality used by information technology (IT) administrators to deploy, update, monitor, and maintain servers remotely.

As illustrated, processor(s) 105 may be coupled to a network controller 125, such as provided by a Network Interface Controller (NIC) or Fibre Channel (FC) controller, coupled to the IHS 100 and allows the IHS 100 to communicate via an external network, such as the Internet or a LAN, via a wired or a wireless connection and/or to support communications by other components of the IHS 100, such as storage drives 140*a*-*n*. In some embodiments, remote access controller 155 may support a sideband bus interface 120 that provides a signal pathway, such as an I2C sideband bus connection, for communicating with the network controller 125. In various embodiments, remote access controller 155 may support various additional such sideband signal pathways with additional components of IHS 100 where sideband connection may be used by the remote access controller 155 in monitoring and managing such components.

The network controller 125 is also be coupled to the IHS processor(s) 105 via an in-band bus 115, such as a PCIe root complex, that is separate from the sideband bus connections used by the remote access controller 155 for management of the network controller 125. In certain embodiments, the remote access controller 155 may additionally or alternatively utilize such in-band bus 115 connections via the operating system of the IHS 100 to communicate with the network controller 125. In such embodiments, remote access controller 155 may query the operating system of IHS 100 via the processor 105 or chipset of the IHS.

As described, virtual systems hosted by IHS 100 may be migrated to a different IHS, such as to a different server within a data center. A virtual system configured for operation on IHS 100 utilizes a network controller 125 configured using a network interface. In certain instances, the IHS to which the virtual system is to be migrated may have a different type of network controller, or may utilize a network controller that is configured differently from network controller 125 of IHS 100. Accordingly, the network interface configuration utilized by virtual system for operation with network controller 125 may be an inoperable configuration on a different IHS.

Figure 2:
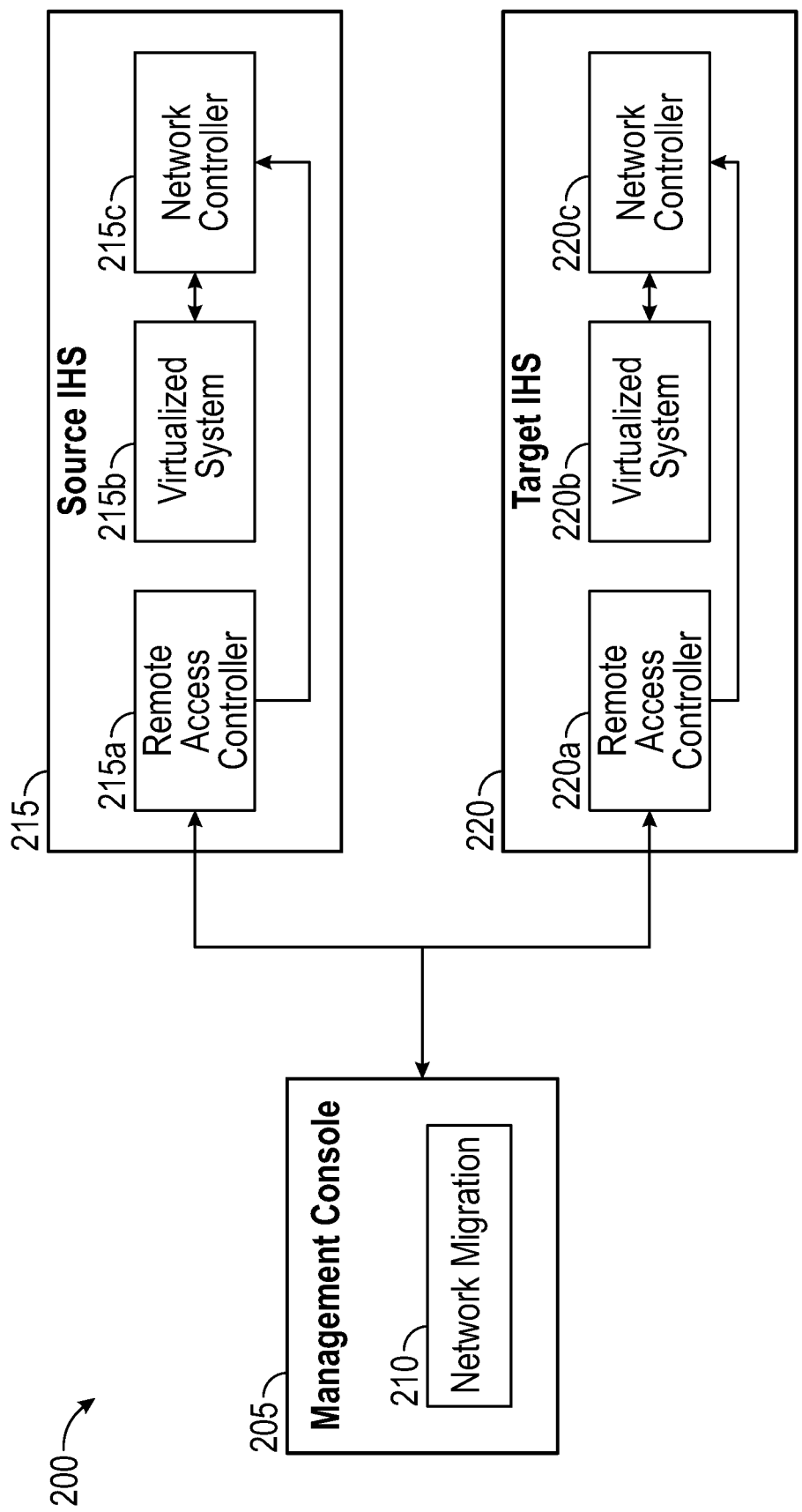
FIG. 2 is a block diagram depicting certain components of a system configured according to various embodiments for adaptive migration of the network interface from a source IHS to a target IHS.

As described in additional detail with regard to FIGS. 1 and 2, the remote access controller 155 may be configured to provide a central management console with the network interface configuration of network controller 125. The remote access controller 155 may provide such information to the management console in scenarios where a virtual system is being moved from IHS 100 to a different IHS. The remote access controller 155 may also provide a network interface to the management console in scenarios where a virtual system is being moved from a different IHS to IHS 100.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

FIG. 2 is a block diagram depicting certain components of a system 200 that may be configured for adaptive migration of a network interface from a source IHS 215 to a target IHS 220. As described with regard to FIG. 1, each managed IHS, such a blade server utilized within a data center, may include a remote access controller 215*a*, 220*a* by which various aspects of managed IHSs 215, 220 may be remotely monitored and administered. In certain embodiments, the remote access controller 215*a*, 220*a* of managed IHSs 215, 220 may communicate with a remote management console 205 in support of transfer and adaptation of a network interface used by the source IHS 215 for use on the target IHS 220. As described, the operations of remote access controller 215*a*, 220*a* may be external to the operating system of a managed IHSs 215, 220, thus allowing such network interface adaptation operation to proceed without the operating systems of the respective managed IHSs 215, 220 and, in some embodiments, in scenarios where the processing cores of the IHSs 215, 220 are not powered or are in a low power state.

In certain embodiments, the remote management console 205 may be a software application, or a component of data center management application, that may communicate with the remote access controller 215*a*, 220*a* in monitoring and managing IHSs, such as IHSs 215, 220, that are installed and are operating within a data center. In certain embodiments, the remote management console 205 may support a graphical user interface by which an administrator may specify a virtualized system 215*b* to be migrated from a source IHS 215 within the data center. In certain instances, the administrator may also use the management console 205 to specify the target IHS 220 to which the virtual system 215*b* is to be migrated.

In certain embodiment, the management console 205 may provide an administrator with an option to utilize a network migration tool 210 to identify IHSs within the data center that may serve as candidate target IHSs, where the candidates are identified based on utilization of network interface configurations that are compatible with the network interface configuration of the source IHS, or that may be compatible upon adaptation of the target network interface by the network migration tool 210 of the management console 205. In certain instances, the indications received by the network migration tool 210 that specify the virtual system 215*b* to be migrated and, in some cases, the target IHS 220, may be generated by an automated process for management of virtual systems within a data center.

Upon receiving an indication of the migration of a virtualized system 215*b*, the network migration tool 210 may issue a query to the remote access controller 215*a* of the source IHS 215 for a network interface configuration in use by a network controller 215*c* of the source IHS 215. In response to the query from the network migration tool 210, the remote access controller 215*a* may obtain the network interface configuration of the source IHS 215 from the network controller 215*c*. As described regard to FIG. 1, the remote access controller 215*a* may utilize a sideband signaling pathway for retrieving the configuration of the network controller 215*c*. The network migration tool 210 may similarly obtain a network interface configuration of the target IHS 220 via a query to the remote access controller 220*a* of the target IHS 220, where the network interface configuration may be retrieved from the network controller 220*c* of the target IHS 220 by the remote access controller 220*b*.

Figure 3:
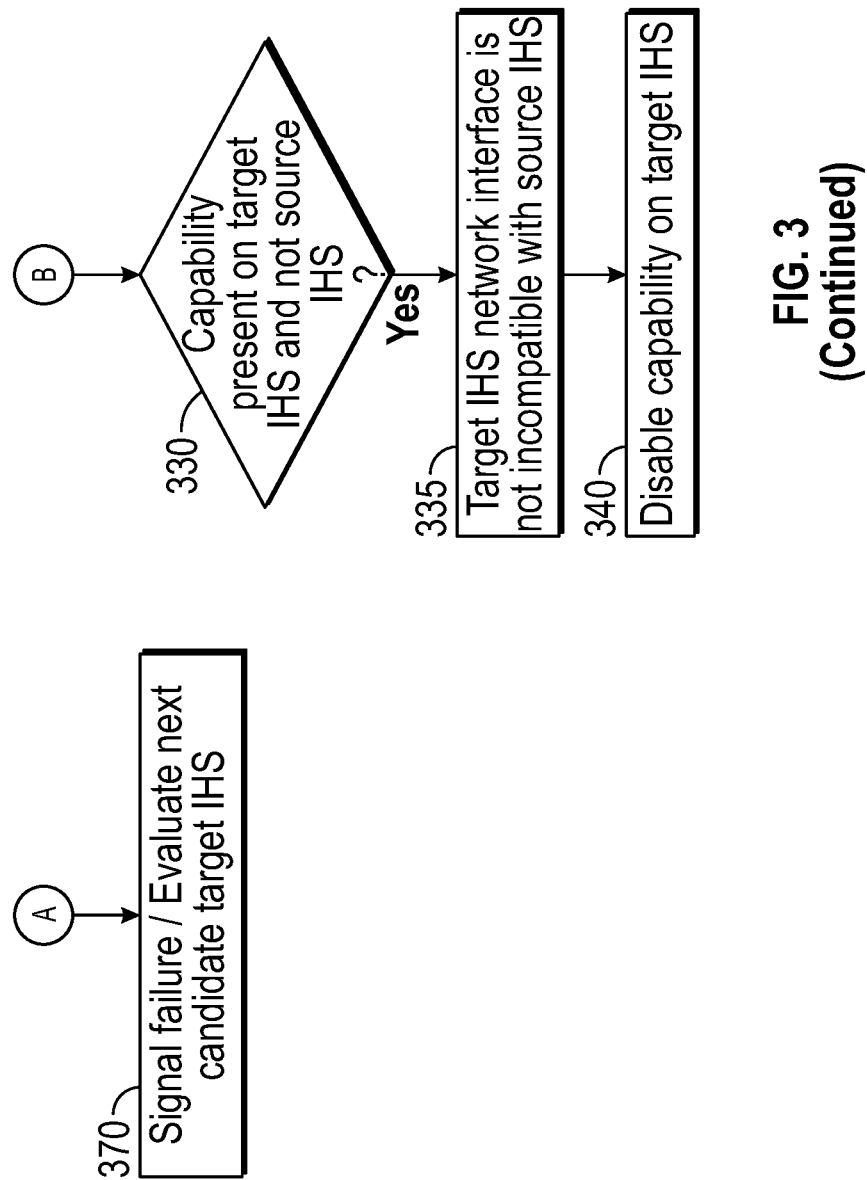
FIG. 3 is a flow chart illustrating certain steps of a process according to certain embodiments for adaptive migration of the network interface from a source IHS to a target IHS.

As described in additional detail with respect to FIG. 3, the network migration tool 210 may evaluate the network interface configuration of the source IHS 215 currently in use by the virtualized system 215*b* in comparison to the network interface configuration of the target IHS 220. The network migration tool 210 may identify the discrepancies between the source network interface configuration and the target network interface configuration. Based on the identified discrepancies, the network migration tool 210 may determine whether the target network interface may be adapted to be compatible, or at least not incompatible, with the source network interface in use by the virtualized system 215b.

If the target network interface is deemed incompatible with the source network interface by the network migration tool 210, in certain embodiments, the network migration tool 210 may similarly evaluate network interfaces utilized by other available IHSs that may host the virtualized system 215b. On such embodiments, the network migration tool 210 may evaluate multiple IHSs as potential targets for migration of a virtualized system 215b based on the configuration of the source network interface. Each IHS may be evaluated by the network migration tool 210 according the process set forth with regard to FIG. 3. Based on the number and type of discrepancies between the source network interface and each evaluated candidate target interface, the network migration tool 210 may identify a target IHS that utilizes a target network interface that most closely aligns with the configuration of the source network interface, where this alignment includes adaptive modifications of the target network interface.

FIG. 3 illustrates certain steps of a process according to certain embodiments for adaptive migration of the network interface from a source IHS to a target IHS. The illustrated embodiment begins at block 305 with the network migration tool receiving a notification that a virtualized system operating on a source IHS is to be migrated. As described, such notifications may be received from manual administrators or from automated management processes. In certain embodiments, the notification may specify a target IHS to which the virtualized system is to be migrated. In other embodiments, the notification does not specify a target IHS and may instead request the network migration tool to evaluate available IHSs within the data center in order to identify candidate target IHSs that have network interface configurations that are compatible, or can be adapted to be compatible, with the network interface configuration of the source IHS.

At block 310, the network migration tool may retrieve the current network interface configuration of the source IHS. As described, the network interface configuration currently in use by the virtualized system to be migrated from a source IHS may be retrieved via a query to the remote access controller of the source IHS. At block 315, the network migration tool may similarly retrieve the current configuration of the network interface of the target IHS. As with the source IHS, the configuration of the network interface of the target IHS may be obtained via a query to the remote access controller of the target IHS.

Once the network migration tool has obtained the network interface configurations of the source IHS and the target IHS, at block 320, the network interfaces may be compared in order to evaluate the compatibility of the two network interface configurations. In certain embodiments, the network interface configurations may be compared by evaluating the attributes of the network interface configurations that specify capabilities supported by each of the network interfaces. A network interface capability attribute may specify whether the interface supports a specific functionality, such as support for offloading certain network operations to an offload engine or support for portioning network ports of the network controller configured by the network interface. Capability attributes are typically configured in a network interface as being either available or unavailable.

At block 325, the network interface configurations of the source IHS and the target IHS are both evaluated for support for a network interface capability. In particular, the capability may be deemed compatible in the two network interface configurations, at block 375, if the capability is available in both network interface configurations. In addition to considering the availability of a network interface capability, the network migration tool evaluates whether a capability is being utilized by the source network interface. In certain instances, the utilization of a capability may be specified in a network interface configuration as an attribute that indicates the capability is enabled or disabled. Other utilizations of the capability may be specified using non-binary attributes. For instance, for a capability for logically partitioning ports of a network controller, the utilization of such an attribute may specify the number of partitions of a network port. In instances where a source network interface includes support for a partitioning capability and includes a specific partitioning of a port, the target network interface is deemed compatible with respect to a network interface capability if the target network interface also supports partitioning and can be configured to utilize the specific partitioning used by the source IHS.

In instances where the source IHS and target IHS network interface configurations do not both support a capability, the network migration tool may continue at block 330 or at block 345. At block 330, the network migration tool determines whether the capability is present in the network interface of the target IHS, but the capability is not present in the network interface of the source IHS. Such scenarios may occur when the network controller of the target IHS is newer than the network controller of the source IHS and supports additional capabilities. Such scenarios may also occur when the network controllers of the target IHS and the source IHS are provided by different manufacturers and/or are different models.

If a capability is only present in the network interface of the target IHS and not the source IHS, at block 335, the network migration tool determines that the network interface of the target IHS is not incompatible with the network interface of the source IHS. Although the two network interfaces are not fully compatible, since the virtual system did not have access to this capability on the source IHS, the network migration tool may disable the capability on the network interface of target IHS. With the compatibility of the capability determined and the network interface of the target IHS configured, the network migration tool may revert to block 320 and may continue evaluation of additional network interface capabilities.

At block 345, the network migration tool determines whether the capability is only present in the network interface of the source IHS not the target IHS. Such scenarios may occur when the network controller of the source IHS is newer and supports additional features in comparison to the network controller of the target IHS. If the capability is only present in the network interface of the source IHS, at block 350, the network migration tool determines whether the utilization attributes of the network interface of the source IHS indicate that the capability is utilized by the source IHS. For instance, a partitioning capability may be supported by network interface of the source IHS, but the utilization of the partitioning capability may be either enabled or disabled.

If the capability is not being utilized by the source IHS, at block 355, the network migration tool determines that the network interface configuration of the target IHS is not incompatible with the current configuration of the network interface of the source IHS. The source network interface supports this additional capability, but since the capability was not in use on the source IHS, the virtualized system does not need this capability to be supported in the target network interface. In order to prevent potential errors caused by attempts to enable a capability on the target IHS that is not supported by its network interface, at block 360, the attributes for capability may be removed or otherwise omitted from the network interface configuration of the target IHS.

If, however, the utilization attributes of the network interface of the source IHS indicate that this capability is being utilized by the source IHS, at block 365, the network migration tool determines that network interface configuration from the target IHS is not compatible with the network interface of the source IHS. In such scenarios, a capability of the source IHS network interface is currently utilized such that an error condition will result if the virtualized system is migrated to the target IHS and attempts to continue to utilize this capability, which is not supported by the target IHS. Accordingly, the target IHS is not a suitable host for the virtualized system being migrated from the source IHS. At block 370, network migration tool may signal an error condition notifying an administrator or administrative process that the proposed migration of the virtualized system is not supported by the network interface of the target IHS. In embodiments where the network migration tool has been tasked with identifying candidate target IHSs, the network migration tool may revert to block 315 and begin evaluating the network interface of another target IHS for compatibility with the network interface of the source IHS.

As described with regard to block 375, a target network interface may be deemed compatible with a source network interface with respect to a capability if both interfaces support that capability. Since the network interface configurations are compatible with regard to supporting the capability, the target network interface may be configured to include the same utilization of the capability as the source network interface. However, certain preferences may be used in configuring the utilization of capabilities on the target IHS. Typically, a target network interface that most closely mirrors the source network interface is preferred, but deviations from the source network interface may be acceptable as long as incompatibilities are not introduced by the target network interface.

In certain scenarios that present the most preferred mapping of utilizations, the network interface of the target IHS may configured with the identical utilization attributes as the source IHS. For instance, a source network interface may specify various partitions for network ports of the network controller. In such partition configurations, a primary port partition may define a set of logical channels to which bandwidth and other network resources may be assigned. In addition, one or more nonprimary ports may be defined, where the nonprimary ports inherit certain of the properties from the primary partition, thus allowing a known primary partition to be used to replicate additional partitions. In such scenarios, it is preferable if the network interface of target IHS may be configured to utilize partitions that are identical to the partitions configured in the source IHS. Accordingly, at block 380, the network migration tool may determine whether the network interface of the target IHS may be modified to utilize the identical capability utilization as the source network interface.

If the target network interface can be configured identically to the capability utilization of the source network interface, at block 385, the network migration tool may configure the target network interface accordingly. For instance, if a utilization attribute of the source network interface specifies a capability is enabled, the capability will also be enabled in the target network interface. Similarly, any network port partitions specified in the source network interface are replicated in the target network interface. Configured in this manner, the target network interface replicates a capability of the source network interface and thus provides a preferred match in scenarios where the network migration tool is evaluation multiple candidate target IHSs for the best compatibility with the source network interface used by the virtualized system being migrated.

If the target network interface cannot be configured identically to the capability utilization of the source network interface, at block 390, the network migration tool adjusts the target network interface to provide an equivalent capability utilization as the source network interface. For instance, in a scenario where the source network interface includes a network port configured with four partitions and no single port exists on the target network interface with capacity for four partitions, the network migration tool may configure the target network interface to operate using four partitions that are spread across two network ports. This provides an equivalent functionality that, although less preferable than an identical configuration of network port partitions, is compatible with the partitions utilized by the source network interface.

As described above, in certain embodiments, the network migration tool may be tasked with evaluating available target IHSs in order to identify candidates with network configurations that can support the virtualized system. In such embodiments, the network migration tool may evaluate the network interface of multiple candidate IHSs in order to identify the best match with the source network interface. The network migration tool may apply the process of FIG. 3 in evaluating the compatibility of each capability that is included in the source network interface and a candidate network interface. The network migration tool may score the strength of the compatibility of a candidate target network interface based on the number of capabilities of the source network interface that can be supported identically on the candidate target interface. Such scoring may also reflect less preferred support for a capability in which an equivalent, but not identical, utilization can be configured in the target network interface. Additional scoring may reflect capabilities that are not utilized (e.g., not enabled) and thus are not required for compatibility, but nonetheless require removal of these capabilities from the target network interface in order to avoid error conditions resulting from attempts to enable unavailable capabilities. In certain embodiments, the network migration tool may further score the suitability of a target network interface based on additional matches with attributes of the source network interface, such as the manufacturer or provider of the network interface, the installed location of the network device configured by the network interface, and the firmware version used by the network device. Based on such scoring, the network migration tool may identify the target IHS with the network interface that is most suitable for migration of a virtualized system.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for migration of a network interface from a source IHS (Information Handling System) to a corresponding network interface of a target IHS, the method comprising:
   identifying a first capability of the source network interface that is not available in the target network interface;
   if the first capability is utilized in the source network interface, signaling incompatibility of the target network interface for the migration;
   identifying a second capability of the target network interface that is not available in the source network interface;
   removing the second capability from the target network interface;
   identifying a third capability that is available in the source network interface and the target network interface; and
   configuring a utilization of the third capability in the target network interface to be compatible with a utilization of the third capability in source network interface.

2. The method of claim 1, wherein the utilization of the third capability comprises one of: enabling the third capability and disabling the third capability.

3. The method of claim 2, wherein the utilization of the third capability further comprises configuring a plurality of network port partitions of the target network interface identical to a plurality of network port partitions of the source network interface.

4. The method of claim 3, wherein the identical configuration of network partitions maintains a primary partition and a plurality of non-primary partitions of the source network interface in the configuration of the target network interface.

5. The method of claim 2, wherein the configuration of the utilization of the third capability further comprises configuring a plurality of network port partitions of the target network interface in a compatible configuration with a plurality of network port partitions of the source network interface.

6. The method of claim 1, wherein the target IHS is selected for the migration based on a correspondence between an installed location of a target network device configured by the target network interface and an installed location of a source network device configured by the source network interface.

7. The method of claim 1, wherein the target IHS is selected for the migration based on a correspondence between a provider of a target network device configured by the target network interface and a provider of a source network device configured by the source network interface.

8. The method of claim 1, further comprising:
   determine a compatibility of the first capability, if the first capability is not utilized in the source network interface.

9. A system for migration of a network interface from a source IHS (Information Handling System) to a corresponding network interface of a target IHS of a plurality of managed IHSs, the system comprising:
   the plurality of Information Handling Systems (IHSs) comprising a source IHS and a target IHS:
   a network migration tool operable to migrate a network interface from the source IHS to a corresponding network interface of the target IHS, wherein the network migration tool is configured to:
      identify a first capability of the source network interface that is not available in the target network interface;
      if the first capability is utilized in the source network interface, signal incompatibility of the target network interface for the migration;
      identify a second capability of the target network interface that is not available in the source network interface;
      remove the second capability from the target network interface;
      identify a third capability that is available in the source network interface and the target network interface; and configure a utilization of the third capability in the target network interface to be compatible with a utilization of the third capability in source network interface.

10. The system of claim 9, wherein the utilization of the third capability comprises one of: enabling the third capability and disabling the third capability.

11. The system of claim 10, wherein the utilization of the third capability further comprises configuring a plurality of network port partitions of the target network interface identical to a plurality of network port partitions of the source network interface.

12. The system of claim 11, wherein the identical configuration of network partitions maintains a primary partition and a plurality of non-primary partitions of the source network interface in the configuration of the target network interface.

13. The system of claim 10, wherein the configuration of the utilization of the third capability further comprises configuring a plurality of network port partitions of the target network interface in a compatible configuration with a plurality of network port partitions of the source network interface.

14. The system of claim 9, wherein the target IHS is selected for the migration from the plurality of IHSs by the network migration tool based on a correspondence between an installed location of a target network device configured by the target network interface and an installed location of a source network device configured by the source network interface.

15. The system of claim 9, wherein the target IHS is selected for the migration from the plurality of IHSs by the network migration tool based on a correspondence between a provider of a target network device configured by the target network interface and a provider of a source network device configured by the source network interface.

16. The system of claim 9, network migration tool is further configured to:

determine a compatibility of the first capability, if the first capability is not utilized in the source network interface.

17. A target IHS (Information Handling System) configured for migration of a network interface from a source IHS to a corresponding network interface of the target IHS, the target IHS comprising:
    a network device configured by the target network interface, wherein the target network interface is determined as incompatible if a first capability of the source network interface is not available in the target network interface and the first capability is utilized in the source network interface; and
    a remote access controller operable to configure the target network interface, wherein the remote access controller is configured to:
        remove a second capability from the target network interface, wherein the second capability is not available in the source network interface; and
        configure a utilization of the third capability of the target network interface to be compatible with a utilization of the third capability in source network interface.

18. The IHS of claim 17, wherein the utilization of the third capability comprises one of: enabling the third capability and disabling the third capability.

19. The IHS of claim 18, wherein the utilization of the third capability further comprises configuring a plurality of network port partitions of the target network interface identical to a plurality of network port partitions of the source network interface.

20. The IHS of claim 19, wherein the identical configuration of network partitions maintains a primary partition and a plurality of non-primary partitions of the source network interface in the configuration of the target network interface.

* * * * *